United States Patent
Stengele et al.

(10) Patent No.: US 7,120,391 B2
(45) Date of Patent: Oct. 10, 2006

(54) FIELD TRANSMITTER

(75) Inventors: Florian Stengele, Hausen (DE); Michael Krause, Steinen (DE); Wolfram Lütke, Inzlingen (DE); Vincent de Groot, Wehr (DE)

(73) Assignee: Endress + Hauser GmbH + Co., Maulburg (DE)

( * ) Notice: Subject to any disclaimer, the term of this patent is extended or adjusted under 35 U.S.C. 154(b) by 773 days.

(21) Appl. No.: 09/899,237

(22) Filed: Jul. 6, 2001

(65) Prior Publication Data

US 2002/0004370 A1    Jan. 10, 2002

(30) Foreign Application Priority Data

Jul. 6, 2000    (DE) .................. 100 32 774

(51) Int. Cl.
*H04B 7/00*    (2006.01)
(52) U.S. Cl. .................. 455/41.3; 455/67.11; 455/418; 340/870.02
(58) Field of Classification Search .............. 455/41.2, 455/41.3, 67.11, 418, 419, 420; 340/870.02–870.04
See application file for complete search history.

(56) References Cited

U.S. PATENT DOCUMENTS

| | | | |
|---|---|---|---|
| 5,173,855 A * | 12/1992 | Nielsen et al. | 700/284 |
| 5,875,186 A * | 2/1999 | Belanger et al. | 370/331 |
| 5,917,840 A | 6/1999 | Cheney et al. | |
| 5,974,312 A * | 10/1999 | Hayes et al. | 455/419 |
| 6,055,633 A | 4/2000 | Schrier et al. | |
| 2004/0204041 A1* | 10/2004 | Fillebrown et al. | 455/41.2 |

FOREIGN PATENT DOCUMENTS

DE    40 00 443 C2    12/1990
DE    695 14 001 T2    2/1996

OTHER PUBLICATIONS

Meyer, Eric: Das Bluetooth-Konzept (German Text).
Heil, Thorsten et al: Funkubertragung in Feldbussystemen (German Text).
Interkama '92: Intelligente Messumformer fur die Prozessmesstechnik, W. Scholz und H. Balling, pp. 157-161.

* cited by examiner

Primary Examiner—Lee Nguyen
(74) Attorney, Agent, or Firm—Bacon & Thomas

(57) ABSTRACT

A field transmitter F, a control device B is in the form of a separately portable unit linked to a field transmitter S1 by radio over short ranges. This eliminates the need to make a direct visit to an inaccessible field transmitter S1 for control purposes. In addition, one control device B can be used to control a plurality of field transmitters S1, S2, S3, A1, A2 by radio. In situ control, which is normally permanently integrated into the field transmitters S1, S2, S3, A1, A2, can be dispensed with.

9 Claims, 1 Drawing Sheet

FIELD TRANSMITTER

FIELD OF THE INVENTION

The invention relates to a field transmitter for process automation.

BACKGROUND OF THE INVENTION

In automation technology, field transmitters are frequently used, which serve for recording and/or influencing process variables. Examples of such field transmitters are level measuring instruments, mass flowmeters, pressure gages, temperature gages etc., which record the corresponding process variables—level, mass flow, pressure and temperature. Process variables are influenced using "actuators" which, in the form of valves, for example, influence the flow of a liquid in a pipeline section.

The field transmitters are generally connected to a central control unit which controls the whole process flow. The central control unit evaluates and monitors the measured values for the various process variables and drives the appropriate actuators accordingly in order to influence the process.

Data are transmitted between field transmitter and control unit on the basis of the known international standards for field buses, such as 4–20 mA current loop, Hart, Foundation Fieldbus, Profibus etc.

Since the field transmitters are usually started up and adjusted in situ, a control device integrated in the field transmitter (in situ control) is provided which permits manual input of data required for smooth operation of the field transmitter. By way of example, these data may be calibration data, parameter setting data or other individual settings. Normally, the control device also includes a display in addition to a manual input facility, said display facilitating the input of data by means of appropriate menu control (multisegment display, matrix display), for example. In addition, the display usually also permits the instantaneous measured value of the process variables to be displayed in graphical or digital form.

Such control devices have various drawbacks.

Since the keyboard and the display of the control device need to be protected against the process conditions (dust, moisture etc.) and also against mechanical influence, additional protective flaps are required on the housing of the field transmitter, and also appropriate seals.

In some cases, the control device also needs to be sealed from the interior of the field transmitter housing. These seals are very costly, particularly in the case of applications where there is a risk of explosion (Ex field).

In addition, the control device needs to be controlled in an appropriate manner by a microprocessor, which firstly costs computer power and also possibly additional energy.

In some cases, the control device needs to be integrated in already existing field transmitter housings. Since there is usually a lack of space in the housings, this is possible only with increased complexity.

The individual parts of the control device, keyboard and display etc. increase the complexity of production and are additionally cost-intensive and prone to error. If the control device fails or malfunctions, the field transmitter needs to be visited and repaired in situ by a service technician.

When considered over the operating time of the field transmitter, the control device is used only extremely rarely, but is nevertheless present in many field transmitters.

In each case, the control device can be used to control only the particular field transmitter in which it is permanently integrated.

SUMMARY OF THE INVENTION

The object of the invention is to specify a field transmitter which does not have the aforementioned drawbacks.

This object is achieved by a field transmitter for process automation having a control device for data input and display, wherein the control device is in the form of a separately portable unit, and control device and field transmitter are linked by radio, the radio link being limited to the local area surrounding the field transmitter.

In accordance with one preferred embodiment of the invention, the radio link is effected on the basis of the Bluetooth standard.

In accordance with another preferred embodiment of the invention, the field transmitter has a microprocessor which is connected to a Bluetooth chipset. The control device likewise has a Bluetooth chipset connected to a microprocessor.

In accordance with another preferred embodiment of the invention, an antenna connection is provided on the housing of the field transmitter.

In accordance with another preferred embodiment of the invention, the field transmitter is used for recording a process variable.

In accordance with another preferred embodiment of the invention, the field transmitter is connected to a central control unit by means of a data bus.

In accordance with another preferred embodiment of the invention, the data transmission rate between field transmitter and control device is approximately 1 Mbit/sec.

In accordance with another preferred embodiment of the invention, the control device is a portable computer (laptop or miniature computer).

In accordance with one preferred application of the invention, the control device is used to transmit software changes (updates/upgrades) to the field transmitter.

In accordance with one preferred application of the invention, the control device is used to initiate a "recurrent test" on the field transmitter.

In accordance with one preferred application of the invention, the control device is used to make a status query for the purpose of "predictive maintenance" of the field transmitter.

It is a fundamental idea of the invention for the control device to be designed as a separately portable unit and for a relatively short-range radio link to be set up between control device and field transmitter.

This permits field transmitters to be controlled simply and inexpensively. The production complexity for a field transmitter is greatly reduced, since the control device integrated in the field transmitter can be dispensed with.

In addition, one control device can be used for a plurality of field transmitters.

A single piece of software for the control device can be used to control an entire family of field transmitters consistently.

The short range of the radio link means that only little power is consumed on the part of the field transmitter.

BRIEF DESCRIPTION OF THE DRAWINGS

The invention is explained in more detail below with the aid of an exemplary embodiment shown in the drawing, in which.

DESCRIPTION OF THE PREFERRED EMBODIMENT

Figure 1:
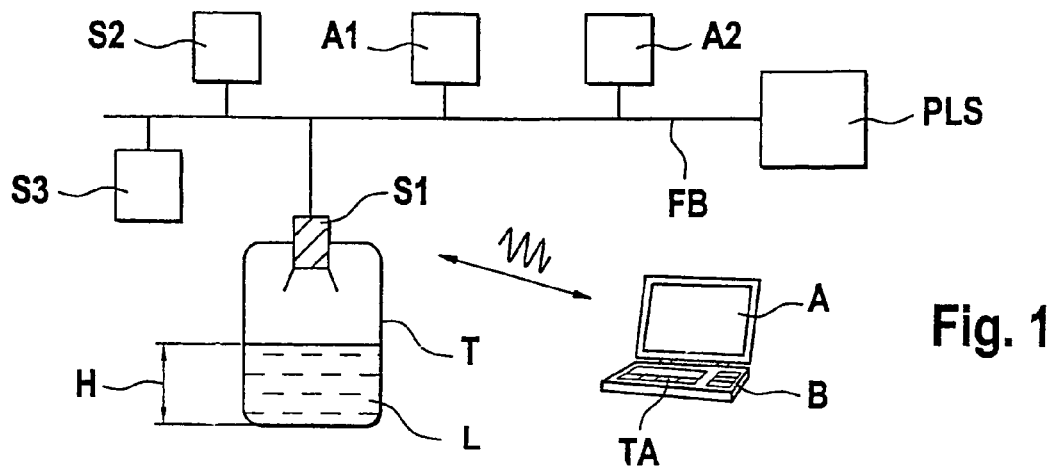
FIG. 1 is a schematic illustration of a field bus with an inventive field transmitter and control device.

FIG. 1 shows a level gage S1 arranged on a tank T, as an example of a field transmitter. The level gage S1 records the level H of a liquid L in the tank T.

The level H in the tank T is measured using a radar pulse timing method. In this context, a radar pulse from the level gage S1 is sent in the direction of the surface of the liquid L, and the pulse reflected from the surface of the liquid is registered. The delay time of the radar pulse is used to deduce the liquid level H.

The level gage S1 is connected to a process control system PLS, used as a central control unit, by means of a field bus FB. The level gage S1 and the process control system PLS are able to communicate with one another via the field bus FB. Normally, the instantaneous measured values of the level gage S1 are sent to the process control system PLS and are evaluated there.

By way of example, other sensors S2, S3 and actuators A1, A2 are also connected to the field bus FB. Further process variables are recorded using these sensors S2, S3 or are influenced using the actuators A1, A2.

The level gage S1 is controlled using a portable control device B. In the case illustrated, the control device is a portable computer (laptop) having a keyboard TA and a screen as display A.

The control device B used may also be a handheld appliance, i.e. a specific control unit usually developed by the manufacturer of the field transmitter. In addition, commercially available telephones (mobiles) or portable miniature computers (palmtops) are also conceivable as control devices B.

Figure 2:
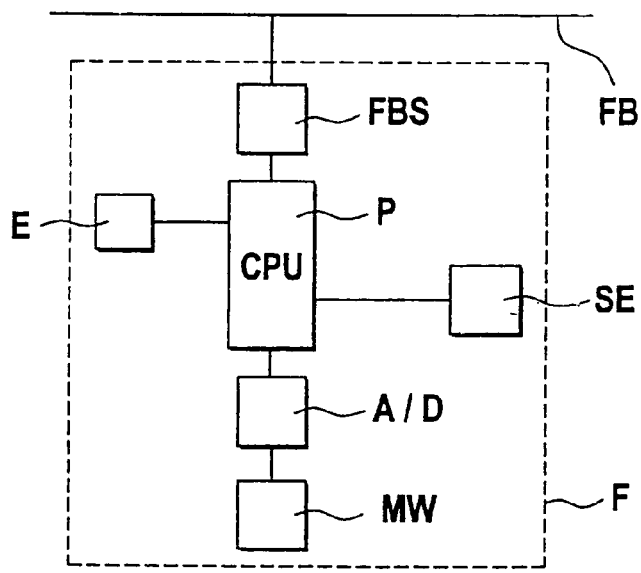
FIG. 2 is a schematic illustration of an inventive field transmitter.

FIG. 2 is a schematic illustration of an inventive field transmitter F. The field transmitter F in essence comprises a microprocessor P having a memory E.

The microprocessor P is connected to a measured value pickup MW via an analog/digital converter A/D. The measured value pickup MW is used for recording the process variable 'level'.

The microprocessor P is connected to a field bus FB via a field bus interface FBS.

For the purpose of communicating with the control device B, the microprocessor P is connected to a transceiver unit SE.

Figure 3:
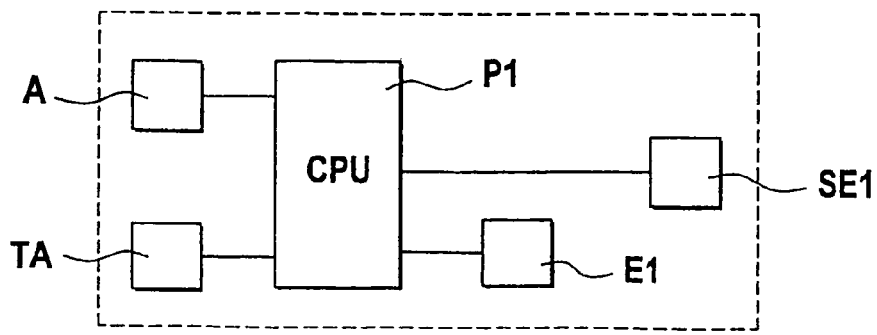
FIG. 3 is a schematic illustration of an inventive control device.

FIG. 3 shows the control device B in more detail. It comprises, in essence, a microprocessor P1 connected to an input keyboard TA, to a display A and to a memory E1.

In addition, the microprocessor P1 is connected to a transceiver unit SE1 designed in accordance with the transceiver unit SE.

The control device B is in the form of a separately portable unit.

The way in which the invention works is explained in more detail below.

When starting up, setting parameters for or controlling the field transmitter F, the relevant data are transmitted by radio between the control device B and the field transmitter F.

The relevant data can be input manually, for example using the keyboard TA of the control device B.

Since the control device B has a display A as a screen, the input can be acknowledged from the field transmitter F. Matrix displays or multisegment displays (not shown in more detail) may be used for this purpose.

Since the relevant field transmitter F on the appropriate process component (tank, pipeline) needs to be visited by the service personnel for the purposes of startup or parameter setting, it is sufficient for the radio link to be limited to the local area (approximately 10 m) surrounding the control device B. This means that only a limited number of field transmitters are ever in the range of the control device B. Radio transmission can therefore be used to start up and set parameters for inaccessible field transmitters, or field transmitters which are accessible only with difficulty, in a simple manner. The only condition for this is that the range of the radio link be sufficient to reach the field transmitter F from an easily accessible point.

Advantageously, data are transmitted between field transmitter F and control device B on the basis of the Bluetooth standard. This standard for the transmission of data by radio between separate electronic appliances has been agreed to by leading manufacturers, such as Ericsson, Nokia, IBM, Toshiba and INTEL. These and other manufacturers have combined to form a syndicate SIG, which has formulated the Bluetooth standard and is developing it further. The Bluetooth specification 1.0 A was stipulated at the end of July 1999.

Since this technology is an International standard, the corresponding Bluetooth chips can be manufactured cheaply on a large scale.

Advantageously, the two transceiver units SE and SE1 are integrated circuits (ICs) in the form of a single chip or in the form of a chipset (e.g. Bluetooth chip or Bluetooth chipset). They provide a simple way of permitting data transmission by radio in its entirety, i.e. all send and receive functions, including data encryption. They also require only a very small amount of power (approximately 50 mA).

If no data have been received by the transceiver unit SE for a relatively long time, the power consumption of the transceiver unit SE can be reduced further by means of automatic changeover to a park phase. In this park phase, the transceiver unit SE is ready for operation only to a limited extent. It first needs to be "awoken" from this state in order to ensure that it is fully operational. This transition takes only a second, or a few seconds, however. This short delay is not a problem for the user of the control device, though. The fact that the integrated control device has been dispensed with means that additional power is no longer required in the field transmitter F, particularly for display. In the park phase, i.e. if no data have been received for a relatively long time, a Bluetooth chipset requires only a few microamperes.

At the same time, the program controller for the transceiver unit SE is simpler than for a control device. This may possibly result in a saving in storage space for the microprocessor P, if the Bluetooth software is less extensive.

Since the transceiver unit SE1 has an antenna, this antenna needs to be routed outward in field transmitters having metal housings. To this end, an antenna connection is provided on the housing of the field transmitter. Such an antenna connection is relatively small and can easily be sealed.

As a result of the control device permanently integrated in the field transmitter having been dispensed with, the field transmitter can be of considerably simpler design. Protective flaps are not required, and the complexity of sealing is lower.

The only connection to the interior of the housing of the field transmitter is an antenna connection which can easily be sealed from the process in accordance with the specifications (Ex field) as well.

If the control device B has a dedicated data memory, then changes in the control program (software update, software upgrade) for the field transmitter F can easily be transmitted from the control device B to the field transmitter.

If the control device additionally has access to the Internet (WWW world wide web), then the software changes can be loaded into the control device B in situ over the Internet for the purpose of subsequently transmitting them to the field transmitter F.

Such an Internet link is a simple matter using a radio telephone as control device, for example.

Another advantage afforded by the inventive control device B is in the context of the recurrent test prescribed in accordance with the German Water Resources Management Law. This test requires field transmitters to be regularly tested to establish whether they are fit for operation. For the purposes of this test, a switch on the field transmitter which initiates a test on the field transmitter is usually operated manually. The result of the test is indicated by means of a light-emitting diode on the field transmitter, for example.

These tests can, of course, also be initiated using the inventive control device B.

Similarly, the inventive control device can be used to effect a status query for the field transmitter with regard to predictive maintenance.

An advantage of such a status query or the initiation of a recurrent test is that the necessary communication with the field transmitter is effected without influencing the transmission of measurement data to the process control system PLS.

The data for the test or the status query (service data) are transmitted independently of the measurement data on an entirely different path. In this way, data collisions are prevented.

The field bus is not required for the service data query or for the transmission of service data, which means that no additional bus access is required.

Another advantage is that the field transmitter need no longer be visited directly for querying or testing. This allows such applications to be simplified considerably, in particular shortened, for the user.

Naturally, maintenance information can also be retrieved using the control device.

Since the field transmitter F can be controlled entirely using the control device B, a control device integrated in the field transmitter F is no longer necessary.

A single portable control device B is sufficient for controlling a multiplicity of field transmitters.

In one further development of the invention, each field transmitter (S1,S2,S3,A1,A2) in a process installation has a transceiver device, and the field transmitters (S1,S2,S3,A1,A2) are connected exclusively by radio to a node which is connected to the process control system PLS by means of a data bus. The node likewise has a transceiver device. The node communicates with the appropriate field transmitters (S1,S2,S3,A1,A2) by radio and with the process control system by field bus or another data bus (e.g. Ethernet). A field bus for the transmission of data between field transmitter and node is thus no longer required.

Usually, a node is allocated to one or more field transmitters (S1,S2,S3,A1,A2). The node is installed at an easily accessible point and communicates with the field transmitters in its immediate vicinity. This considerably reduces the wiring complexity, since the field bus FB need no longer be routed to each individual sensor S1, S2, S3 or actuator A1, A2.

In principle, a field transmitter may also serve as a node. The other field transmitters in its vicinity are then connected to it by radio.

The node can also be used for connection to the Internet. If each field transmitter is allocated an Internet address (IP address), then any field transmitter can be addressed from any desired location. In this context, a field transmitter can be remotely monitored over any desired distances. In the extreme case, the process control system and field transmitters may be situated on different continents.

In the case of the field transmitter F according to the invention, the control device B is in the form of a separately portable unit which is connected to the field transmitter F by radio over short distances. This means that it is no longer necessary to visit an inaccessible field transmitter F directly in order to control it. In addition, one control device can be used to control a plurality of field transmitters.

The invention claimed is:

1. A method for controlling a field transmitter S1 for process automation having in combination therewith a control device B for input and display, comprising at least one of the following steps:
   transmitting software changes (up dates/up grades) to the field transmitter S1 using the control device B;
   initiating a recurrent test on the field transmitter S1 using the control device B;
   making a status query for the purpose of predictive maintenance of the field transmitters S1 using the control device B; and
   executing said steps of transmitting, initiating and making by a radio link on the basis of the Bluetooth standard between the field transmitter S1 and the control device B.

2. The method as defined in claim 1, further comprising the steps of:
   providing the field transmitter S1 with a microprocessor P connected to a Bluetooth chipset SE; and
   providing the control device with a microprocessor P1 which is connected to a corresponding Bluetooth chipset SE1.

3. The method as defined in claim 1, further comprising the step of:
   providing an antenna connection on the housing of the field transmitter S1.

4. The method as defined in claim 1, wherein:
   the field transmitter S1 is used for recording a process variable.

5. The method as fined in claim 1, further comprising the step of:
   connecting the field transmitter S1 to a central control unit PLS by means of a field bus FB.

6. The method as defined in claim 1, wherein:
   the control device B is a portable computer (laptop).

7. The method as defined in claim 1, wherein:
   the control device B is a portable miniature computer (palmtop).

8. The method as defined in claim 1, wherein:
   the control device B is a portable handheld appliance.

9. The method as defined in claim 1, wherein:
   the control device B is a portable radio telephone (mobile).

* * * * *